(12) United States Patent
Wilde et al.

(10) Patent No.: US 10,721,279 B2
(45) Date of Patent: Jul. 21, 2020

(54) MANAGING MESSAGES BETWEEN USERS FOR COLLABORATIVE EDITING OF ELECTRONIC DOCUMENTS

(71) Applicant: Microsoft Technology Licensing, LLC, Redmond, WA (US)

(72) Inventors: Benjamin Wilde, Quincy, MA (US); Patrick Gan, Salem, MA (US); Samantha N. Powers, Cambridge, MA (US); Aleksandr Polyakov, Somerville, MA (US); Sudarshan Sundar, Cambridge, MA (US); Graham Baker, Londonderry, NH (US); Douglas Milvaney, Cambridge, MA (US); Joan Weaver, Somerville, MA (US); Nikhil Nathwani, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/260,239

(22) Filed: Jan. 29, 2019

(65) Prior Publication Data
US 2019/0158550 A1 May 23, 2019

Related U.S. Application Data

(63) Continuation of application No. 15/061,969, filed on Mar. 4, 2016, now Pat. No. 10,225,291.

(51) Int. Cl.
*G06F 15/16* (2006.01)
*H04L 29/06* (2006.01)
(Continued)

(52) U.S. Cl.
CPC ........ *H04L 65/4023* (2013.01); *G06F 3/0481* (2013.01); *G06F 40/166* (2020.01);
(Continued)

(58) Field of Classification Search
USPC ....... 709/204, 203, 205, 206, 217, 219, 223, 709/224, 226, 228, 230, 232, 238;
(Continued)

(56) References Cited

U.S. PATENT DOCUMENTS 9,542,391 B1 *  1/2017  Eisner ................. G06F 16/1767
9,977,815 B2 *  5/2018  Chandran .............. G06F 16/24
(Continued)

OTHER PUBLICATIONS

"Final Office Action Issued U.S. Appl. No. 15/061,969", dated May 17, 2018, 9 Pages.

*Primary Examiner* — Quang N Nguyen
(74) *Attorney, Agent, or Firm* — Alleman Hall Creasman & Tuttle LLP (57) ABSTRACT

To manage complexity related to messages and comments about collaboratively edited electronic documents, an electronic document has associated activity data and comment data, where a type of activity data includes messages among users. Message data is stored in a stream of activity data in a format that is accessible both to communication applications outside of the electronic document, and to end user applications for editing the electronic document. The message data can include a document identifier, a user identifier for a sender and/or a receiver, and content of the message. A communication application, given a user identifier, can access document messages for that user, from a single electronic document or over multiple electronic documents. Further, the communication application can be notified when new document messages related to a user identifier are added to one or more electronic documents. Additionally, the end user application, given a document identifier, can access document messages associated with that document identifier for inclusion in the activity data for the document.

20 Claims, 7 Drawing Sheets

(51) Int. Cl.
*G06Q 10/00* (2012.01)
*G06Q 10/10* (2012.01)
*G06F 40/166* (2020.01)
*G06F 3/0481* (2013.01)
*H04L 12/58* (2006.01)
*H04L 29/08* (2006.01)

(52) U.S. Cl.
CPC ........... *G06Q 10/00* (2013.01); *G06Q 10/101* (2013.01); *H04L 51/046* (2013.01); *H04L 51/16* (2013.01); *H04L 67/06* (2013.01)

(58) Field of Classification Search
USPC ........ 707/748; 715/255, 256, 753, 810, 234, 715/760, 781, 229, 751; 726/6; 1/1
See application file for complete search history.

(56) References Cited

U.S. PATENT DOCUMENTS

| | | | | |
|---|---|---|---|---|
| 2001/0039552 | A1* | 11/2001 | Killi | G09B 5/02 715/234 |
| 2007/0288839 | A1* | 12/2007 | Kurosawa | G06F 40/169 715/751 |
| 2009/0217179 | A1* | 8/2009 | Mons | G06F 16/958 715/760 |
| 2011/0239102 | A1* | 9/2011 | Tanaka | G06F 40/169 709/223 |
| 2012/0054667 | A1* | 3/2012 | Beykpour | G06F 3/0486 715/781 |
| 2013/0054613 | A1* | 2/2013 | Bishop | G06F 17/2705 707/748 |
| 2014/0282243 | A1* | 9/2014 | Eye | G06F 3/04883 715/810 |
| 2014/0310345 | A1* | 10/2014 | Megiddo | G06F 15/163 709/204 |
| 2015/0052427 | A1* | 2/2015 | Vagell | G06F 17/24 715/256 |
| 2015/0113390 | A1* | 4/2015 | Vagell | G06F 17/24 715/255 |
| 2015/0248384 | A1* | 9/2015 | Luo | H04L 51/04 715/229 |
| 2015/0317293 | A1* | 11/2015 | Greisson | G06F 17/24 715/256 |
| 2016/0253304 | A1* | 9/2016 | Evers | G06F 16/9574 715/225 |
| 2016/0253512 | A1* | 9/2016 | Evers | G06F 21/6218 726/6 |
| 2016/0378737 | A1* | 12/2016 | Keslin | G06F 3/1415 715/753 |
| 2017/0109909 | A1* | 4/2017 | Whiting | G06Q 10/00 |
| 2019/0121875 | A1* | 4/2019 | Niu | H04W 4/10 |

\* cited by examiner

MANAGING MESSAGES BETWEEN USERS FOR COLLABORATIVE EDITING OF ELECTRONIC DOCUMENTS

CROSS-REFERENCE TO RELATED APPLICATIONS

This application is a continuation application of U.S. patent application Ser. No. 15/061,969, entitled "MANAGING MESSAGES BETWEEN USERS FOR COLLABORATIVE EDITING OF ELECTRONIC DOCUMENTS", filed on Mar. 4, 2016, now issued as U.S. Pat. No. 10,225,291 on Mar. 5, 2019, which is hereby incorporated by reference.

BACKGROUND

The availability of shared storage systems for electronic documents has increased the ability of computer end users to share and to collaborate in the creation of a variety of electronic documents. End users can cause electronic documents to be stored in shared storage systems on a computer network, such as the internet. End users can instruct such a shared storage system to allow electronic documents to be shared with other end users of the shared storage system. A shared storage system generally has an access control component in a file system that tracks, for each electronic document, the access rights that different users have for the electronic document.

After an electronic document has been shared among two or more end users, the shared storage system manages access to the shared electronic document to ensure consistency of the electronic document, especially in the case of collaborative editing of, i.e., collaborative modifications to, the electronic document. A collaboration system manages collaborative modification by tracking which end users currently are using end user applications on client computers to access the same electronic document. The collaboration system typically is implemented as one or more computer programs executing on the server computer, and, in some implementations, may have components executing on the client computers.

In some cases, electronic documents are shared through electronic mail or other communications channels instead of through shared storage. In such circumstances, the end users generally are responsible for tracking versions and maintaining consistency of the electronic document.

End user applications generally allow users to modify electronic documents. For collaborative editing, a typical feature in an end user application is the ability for a user to attach a comment to the electronic document. In general, the comment is either associated with a specific location within the document or within a general comment section of the electronic document.

Generally speaking, users also communicate about their work through communication channels outside of the context of an electronic document edited in an end user application. For example, users may send messages, such as chat messages, instant messages, text messages, electronic messages and the like, to each other about an electronic document through a communication application. Some end user applications allow an end user to initiate communication with other end users using such communication applications.

The distribution of comments and messages about electronic documents within the electronic document as well as in several communication channels using different end user applications and communication applications increases the complexity of managing the collaborative efforts of these users. Further, switching from an end user application to a communication application is unproductive for users because it involves stopping a task with one application and changing context to working with another application, which can disrupt the user's train of thought. Further, with some devices, only one application can be visible at a time, which can make it difficult for a user to remember what the message is about after switching from the end user application with the electronic document to the communication application.

SUMMARY

This Summary is provided to introduce a selection of concepts in a simplified form that are further described below in the Detailed Description. This Summary is intended neither to identify key or essential features, nor to limit the scope, of the claimed subject matter.

To manage complexity related to messages and comments about collaboratively edited electronic documents, an electronic document has associated activity data and comment data, where a type of activity data includes messages among users. Message data is stored in a stream of activity data in a format that is accessible both to communication applications, outside of the electronic document, and to end user applications for editing the electronic document. The message data can include a document identifier, a user identifier for a sender and/or a receiver, and content of the message. A communication application, given a user identifier, can access document messages for that user, from a single electronic document or over multiple electronic documents. Further, the communication application can be notified when new document messages related to a user identifier are added to one or more electronic documents. Additionally, the end user application, given a document identifier, can access document messages associated with that document identifier for inclusion in the activity data for the document.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
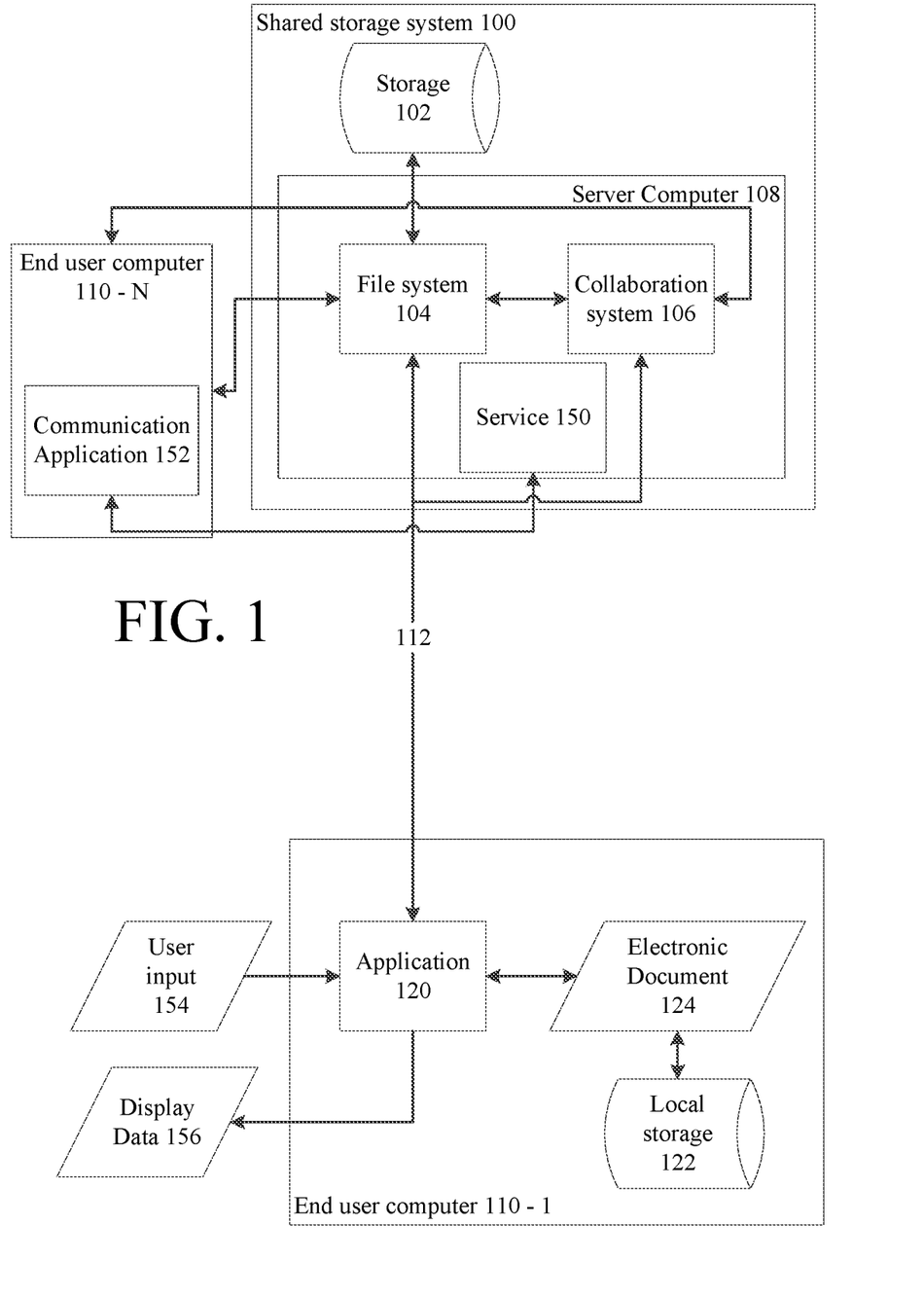
FIG. 1 is a block diagram of an example computer system configured to support collaborative editing of electronic documents through end user applications on multiple client computers.

FIG. 1 is a block diagram of an example computer system configured to support collaborative editing of electronic documents by multiple end users through end user applications on multiple client computers.

A computer system that is configured to support sharing and collaborative modification of electronic documents through multiple end user applications can include a shared storage system 100. The shared storage system 100 generally includes storage 102 in which data is stored in data files accessible through a file system 104 that is part of the shared storage system. The file system configures a server computer 108 to maintain information about each file stored in storage 102. The shared storage system 100 can be implemented using one or more general purpose computers, such as described in connection with FIG. 7, and configured to implement one or more server computers. The shared storage system 100 is responsive to requests over a computer network 112 to access, through the file system 104, files on the storage 102.

Multiple end user computers 110-1 to 110-N, also called client computers herein, are connected to the shared storage system for communication over one or more computer networks 112, such as the internet or a private computer network. An end user computer 110 can be a computer such as described in connection with FIG. 9 and configured as a client computer running one or more applications 120. Examples of such a computer include, but are not limited to, a tablet computer, a slate computer, a notebook computer, a desktop computer, a virtual desktop computer hosted on a server computer, a handheld computer, and a mobile phone including a computer and applications.

The computer network 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 can include one or more end user applications 120. In this context, an end user application is a computer program executed on the end user computer that configures the computer to be responsive to user input 154 to allow an end user to interactively modify an electronic document 124. An electronic document can include any kind of data, such as text, still images, video, or audio and combinations of these, and generally has data defining structure of the electronic document and data defining content of the electronic document within the defined structure. The end user application processes the electronic document, in response to user input received from input devices. For example, the application combines data to create the structure and content of the electronic document. The application also displays or otherwise presents display data 156, such as a graphical user interface including the content according to the structure of the electronic document, through output devices (not shown) to the end user. The application also stores the electronic document in memory and/or in a data file in local storage of the end user computer and/or in the shared storage.

A variety of kinds of end user applications can be used on an end user computer. Examples of an end user application include, but are not limited to, a word processing application, a presentation application, a note taking application, a text editing application, a paint application, an image editing application, a spreadsheet application, a desktop publishing application, a drawing application, a video editing application, and an audio editing application. An end user application can permit a variety of operations on an electronic document, such as, but not limited to, viewing and commenting without content editing, viewing and content editing, or viewing only.

An end user application generates an electronic document that is stored in a data file. Such a data file can be stored in local storage 122 and/or the shared storage system 100. The electronic document, while being modified by an end user on the end user computer, also is temporarily stored in memory on the end user computer. The end user application also may temporarily store the electronic document in a cache on local storage before committing changes to the electronic document to the data file.

An end user computer 110 also can include one or more communication applications 150. A communication application is a computer program executed on the end user computer that configures the computer to be responsive to user input to allow an end user to interactively receive and read, or compose and send, electronic messages; display data, such as a graphical user interface including electronic messages, can be presented through output devices (not shown) to the end user. An electronic message can include any kind of data, such as text, still images, video, or audio and combinations of these, and generally includes identifiers for a sender and one or more recipients of the electronic message.

A variety of kinds of communication applications can be used on an end user computer. Examples of a communication application include, but are not limited to, an electronic mail application, an instant messaging application, a chat application, a real time voice and/or video communication application, and a notification application.

The communication application 152 can access a corresponding service 150 on the server computer 108 of the shared storage system 100, to access document messages associated with electronic documents stored on the shared storage 100. The service 150, given a user identifier of a user, can identify, through the file system 104, electronic documents to which the user has permission to access document messages. Given a document identifier, the service 150 can access document messages corresponding to the electronic document from the storage 102. The service 150 can be any kind of communication service, such as an email server, a notification service, a chat service, a real time voice and/or video communication service, an instant messaging service or other communication service.

In one example configuration, the service is a notification service and the communication application is an application on a mobile phone that processes notifications. A user can configure the notification service through the application to notify the user if any new document messages are added to documents shared with the user.

For an electronic document stored in a data file in a shared storage system 100, the file system 104 of the shared storage system can include information indicating a sharing state of the electronic document. Such information can be in the form of access controls indicating which end users are authorized to access the electronic document and its related data. The file system also can be configured to be responsive to a query to provide this information to another application, such as an end user application 120 or communication application 152 on an end user computer. The shared storage system can provide information to an application on an end user computer about the sharing state of an electronic document, and permit modification to that sharing state, in a number of ways.

In some implementations, electronic documents can be shared by users by distributing a copy of the electronic document through various distribution channels among multiple users. Each user can modify the electronic document, possibly adding comments or document messages to the electronic document, and then can share the modified electronic document with additional users.

In some implementations, the electronic document is stored in a data file in the shared storage system 100, and the data file is shared, with modification rights, with at least one more end user. In such a case, two or more end user applications on two or more client computers can access and can attempt to modify the electronic document through the shared storage system 100. To handle such a condition, the shared storage system can include a collaboration system 106. The collaboration system 106 is a computer program that configures the server computer to manage contemporaneous access to shared electronic documents in the shared storage system 100. The collaboration system 106 is configured to store information about end user applications and associated end users, that currently are accessing the electronic document.

Using the information about end user applications and end users currently accessing an electronic document, the collaboration system can implement any of a number of different techniques for coordinating access to the electronic document to ensure consistency of the electronic document. For example, the collaboration system can prevent one end user application from causing modifications to be written to a data file for an electronic document while another the data file is open for writing by another end user application. As another example, the collaboration system can interactively merge changes to the electronic document as such changes are being made collaboratively through multiple end user applications. In such a case, as an example, the collaboration system can merge changes received from end user computers in memory local to the collaboration system, and then can transmit a modified version of the electronic document to each end user computer with an application currently accessing the document. Such modifications can include changes to the structure and/or content of the electronic document, changes to comment data associated with the electronic document, and/or updates to the activity data associated with the electronic document.

The data representing an electronic document can be stored in computer storage in a number of different formats. On the one hand, there can be a file format for one or more data files for storing data for an electronic document in persistent storage. On the other hand, there can be one or more data structures stored in memory for providing access to the data for the electronic document by an end user application during editing or viewing of the electronic document. The file format can be and typically is different from the data structure that is stored in memory, yet both store essentially the same data.

Figure 2:
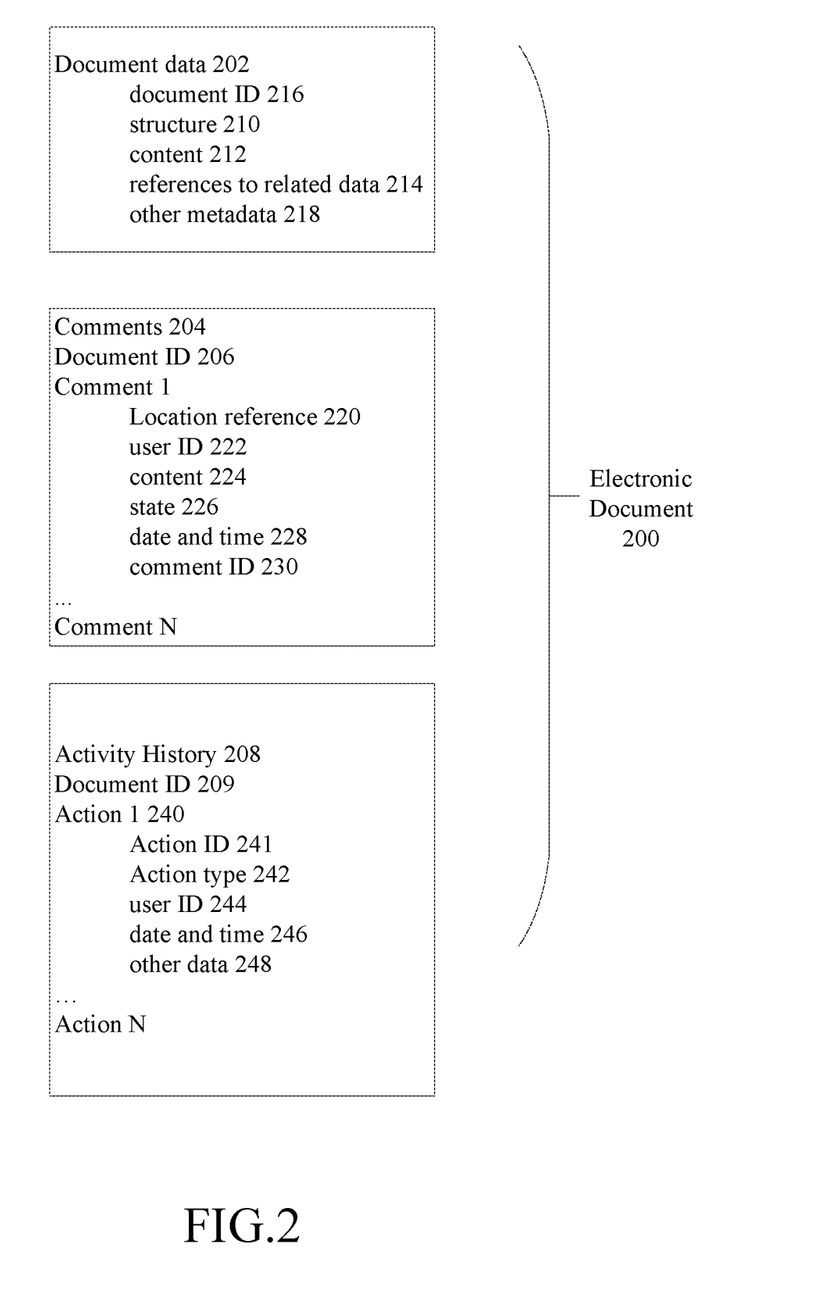
FIG. 2 is a diagram illustrating data structures for storing comment data and activity data for an electronic document.

Referring now to FIG. 2, in general, and whether in a data file in persistent storage or data structure in memory, the data 200 for the electronic document includes data representing structure and content of the document 202, and comment data representing structure and content of comments 204. To assist in managing the complexity of multiple comments and document messages from multiple users, the data for an electronic document also includes data defining activity data 208 associated with the electronic document. The activity data can include, among other things, one or more document messages.

With respect to an example file format, in one implementation, the structure and content data for the document 202 and comment data 204 can be stored in one data file, and activity data 208 can be stored in a separate second data file or database. For example, actions, such as document messages, can be stored as a record in a database and accessible through a document identifier. In another implementation, the structure and content data for the document 202, comment data 204, and activity data 208 all can be stored in a single data file. In another implementation, the structure and content data for the electronic document 202, comment data 204, and activity data 208 each can be stored in separate data files or other data storage such as a database. When such data is read by an end user application, or a communication application that accesses document messages, the end user application may generate corresponding data structures in memory, which in turn are processed and stored into the data files at periodic intervals and/or in response to an instruction received from an end user.

Generally speaking, the data 202 for the electronic document includes a document identifier 216, data defining the structure 210 of the electronic document, and data defining the content 212 within that structure of the electronic document. There is a wide variety of formats for electronic documents, including various markup languages, such as the hypertext markup language (HTML), standard generalized markup language (SGML), extensible markup language (XML), as well as proprietary document formats. The invention is not limited to any particular format for the structure and content of the electronic document. The data for an electronic document may include references to other data related to the electronic document 214, such as files storing comment data, activity data, style sheets for formatting the electronic document, templates, macros and the like. The data for an electronic document also may include various metadata 218 about the electronic document.

Comment data 204 defining a collection of comments can include a document identifier 206 indicating the electronic document to which the collection of comments is related. The comment data can include, for each comment, a reference 220 to a location within the electronic document, a user identifier 222 of the end user that added the comment, and content 224 of the comment, which is typically text but is not limited to text. The reference 220 to a location in a document can be, for example, an offset within the electronic document, such as an offset within the content associated with a structural element of the electronic document. The user identifier can be any indication of a user, such as an email address, user name, etc., such as the user name for the user to access the shared storage system that stores the electronic document. State information 226 also can be associated with a comment, such as data indicating whether the comment has been resolved. A comment also can have an associated date and time stamp 228 indicating when the comment was added to the electronic document. The comment can have a comment identifier 230 that distinguishes the comment from other comments associated with the electronic document.

Comments can be threaded, such that a comment refers to another comment, perhaps in the form of a reply. There are a variety of ways to implement comment threading, such as using the reference 220 of a first comment to refer to a comment identifier 230 of another comment, or using a linked list to represent a comment and any reply comments associated with it.

Data defining comments, in one implementation, can be stored within the electronic document data file, for example as a stream of data within the data file. In this implementation, the data defining the structure and content of the data file can be stored as a separate stream within the data file.

Activity data 208 defining a collection of actions associated with an electronic document can include a document identifier 209 indicating the electronic document to which the collection of actions is related. The activity data can include, for action 240, an action identifier 241 data indicating a type of action 242, a user identifier 244 of the end user associated with the action, and a date and time stamp 246 indicating when the action occurred. As in the comment data, the user identifier can be any indication of a user, such as an email address, user name, etc., such as the user name for the user to access the shared storage system that stores the electronic document. The type of action 242 can indicate whether the action is a document message, or a type of action with respect to the electronic document, or a type of action with respect to a comment. Other data 248, such as text or other information, can be stored as part of the data describing the action 240.

The activity data can represent a variety of different kinds of actions performed by users and associated with the electronic document. Such actions can include actions with respect to an electronic document, for example, opening, saving or closing an electronic document, or sharing an electronic document, and so on. Actions also can be actions with respect to a comment, such as adding, editing, or deleting a comment, reply to a comment, or marking a comment as resolved or unresolved.

In addition, actions also can include document messages. Document messages are messages between or among users associated with the electronic document. In terms of content, document messages can be similar to comments, because comments and document messages generally can include any kind of content. Additionally, document messages can be threaded, similar to comments. However, the structure of a document message is such that data for a document message is stored as an action in the activity data and this data can be read and processed as a conventional message by a communication application. The document message has a sender (the user creating the document message) and one or more recipients (such as all users authorized to access the electronic document or a subset of selected recipients).

In contrast to comments in a document, document messages are not associated with any particular location in the electronic document and appear to a user through an end user application only in renderings of the activity data. Additionally, unlike comments, document messages also are access control limited, so that only users with whom the electronic document is shared in a shared storage system with access rights, have access to the document messages. In particular, the document messages are stored separately from the electronic document in the shared storage system. For example, the document messages (as well as data for other types of actions) can be stored in a database, for example in a JSON format.

Figure 3:
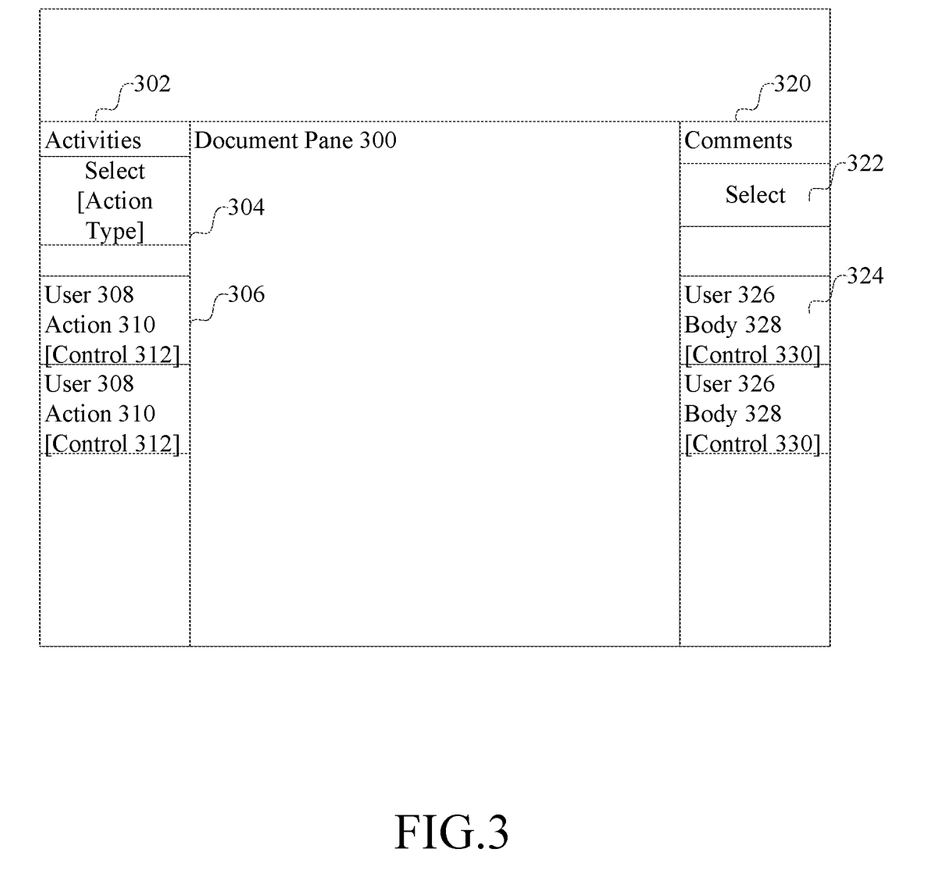
FIG. 3 is an illustration of an example graphical user interface for displaying comment data and activity data in an end user application.

In FIG. 3, an example graphical user interface for an end user application is shown. In this example graphical user interface, a document pane 300 is a primary display area in which the electronic document is presented on a display. The end user computer receives user inputs through one or more input devices, and can associate such inputs with operations with respect to the electronic document in document pane 300, or with respect to other graphical elements in the graphical user interface. The end user computer processes some user inputs to effect modifications to the structure and/or content of the electronic document currently being accessed in the document pane 300.

The graphical user interface for the end user application can include an activity pane 302 in which the end user application displays one or more actions associated with the electronic document. In response to user input, various setting can be provided that control the display of the activity data. For example, the activity pane can include one or more selection elements 304. In response to user inputs with respect to a selection element, the end user application can display actions from the activity data for the electronic document currently presented in the document pane 300. For example, the selection element 304 can provide a mechanism through which the end user application receives inputs specifying how any displayed actions are searched, filtered, sorted, and/or viewed in the activity pane 302. In response to selection of this control, one or more user interface elements can be used to provide for user input of a variety of settings. For example, a user can select to see all actions that are document messages. As another example, a selection element can allow an end user to create a new document message. In response to user input with respect to such a selection element, the end user application can display a new action in the activity pane 302 and allow a user to complete the information for the document message.

In the activity pane, an action is displayed by generating a graphical representation 306 of the action. This graphical representation can include an indication 308 of the user that performed the action, which can include a name, user name and/or picture of the user, and a body 310 of the action, which is typically text. The graphical representation of an action can include other data describing the action as well as have visual appearance parameters related to the action. This graphical representation 306 of an action can be generated using a variety of data accessible through the data for the action. For example, the user identifier can be used to access profile information of the user from the shared storage system.

Given one or more displayed actions in the activity pane, the end user application is configured to be responsive to user input associated with the activity pane to select one or more actions, and to be responsive to user input with respect to a selected one or more actions. For example, the system can be responsive to user input associated with a document message in the activity pane to generate a reply to the document message. As another example, the system can be responsive to user input associated with a selected action in the activity pane to generate a document message to the user associated with the selected action.

For example, graphical elements in the graphical representation of the action can include one or more controls 312, such as buttons, that allow an end user to provide input with respect to a displayed action. For example, for an action that is a document message, a button can be provided to allow a user to reply to that message, thus creating another document message in a thread of document messages. In response to a user manipulating that control, an interface can be presented to a user to enter the body of the document message, and, after completion of data entry by the user, the application can add the corresponding document message as an action to the activity data. As another example, for any action that displays a user, a button can be created around a user identifier or image to allow a user to generate a document message to that user. In response to a user manipulating that button, an interface can be presented to a user to enter the body of the document message, and, after completion of data entry by the user, the application can add the corresponding document message as an action to the activity data.

The activity pane can be programmed to support a wide variety of operations on activity data. For example, the actions can be filtered and/or sorted based on a user, action type, keyword and/or date, or other data, and then displayed in the activity pane. A user of the application can specify how the actions displayed in the activity pane should be filtered and/or sorted. In response to such a specification, the application generates the corresponding display of actions. A scroll bar (not shown) can be provided in the activity pane to allow scrolling of the displayed actions. When the activity pane is displayed, the activity pane also can include a closing element (not shown). Manipulation of the closing element in response to user input results in the end user application closing the activity pane.

With respect to document messages, each document message is an action for which data is stored in the activity data as an action by a user and associated with the electronic document. Thus, using various filtering and sorting operations, a user can locate, for example, all document messages of the document, all document messages added by a selected individual or individuals, all document messages including a particular keyword, and so on.

In the example shown in FIG. 3, the graphical user interface for the end user application also can include a comments pane 320 in which the end user application displays one or more comments associated with the electronic document. It should be understood that a variety of techniques can be used to display and input comments, and the invention is not limited thereby. In response to user input, various settings can be provided that control the display of the comment data. For example, the comments pane can include a selection element 322. In response to user inputs with respect to the selection element, the end user application displays comments for the electronic document currently presented in the document pane 300. For example, the selection element 322 can provide a mechanism through which the end user application receives inputs specifying how comments are viewed in the comments pane 320. For example, the end user application can have a setting for indicating whether all comments are shown or whether only open comments are shown, and whether all comments in a thread are shown or whether only the first comment is shown, or other display settings related to possible states of each comment.

Generally speaking, the data displayed in the comments pane is a representation of the collection of comments, typically starting with a first comment associated with any currently displayed portion of the document. This display can be interactively updated based on a current cursor position in the document or a currently displayed portion of the document. The comment view also can have a scroll bar. In response to manipulation of the scroll bar, different portions of a list of comments can be viewed. The invention is not limited to any particular kind of display of the comment data. The display of the comment data also can be integrated with the display of the structure and content of the electronic document in the document pane.

In the comments pane of FIG. 3, a comment is displayed by generating a graphical representation 324 of the comment including an indication 326 of the user that created the comment, which can include a name, user name and/or picture of the user, and the body 328 of the comment, which is typically text but can include other data, as well as other visual appearance parameters related to the comment. This graphical representation 324 of a comment can be generated using a variety of data accessible through the data for the comment. For example, the user identifier can be used to access profile information of the user from the shared storage system. Given one or more displayed comments, the end user application is configured to be responsive to user input associated with the comments to select one or more comments, and to be responsive to user input with respect to a selected one or more comments. For example, other graphical elements in the graphical representation of the comment can include one or more controls 330, such as buttons, that allow an end user to provide input with respect to a displayed comment, such as an input to add, edit or delete a comment, reply to the comment, mark the comment as resolved, show or hide the thread related to the comment, and so on. In response to manipulating such a control, the corresponding action can be taken.

In the example shown in FIG. 3, the end user application presents the activity pane and the comments pane in the context of the currently accessed electronic document. In particular, in this example, the document pane 300, activity pane 302 and comments pane 320 are displayed in the graphical user interface simultaneously. In this example in FIG. 3, the interfaces are illustrated as panes of the graphical user interface which are non-overlapping and non-modal with the other panes of the interface. The activity pane and comments pane also can be implemented using other graphical user interface techniques. A modal dialog box, a call-out interface, or small pop-up window also are examples of a kind of interface that can be shown in the context of the currently accessed electronic document.

Figure 4:
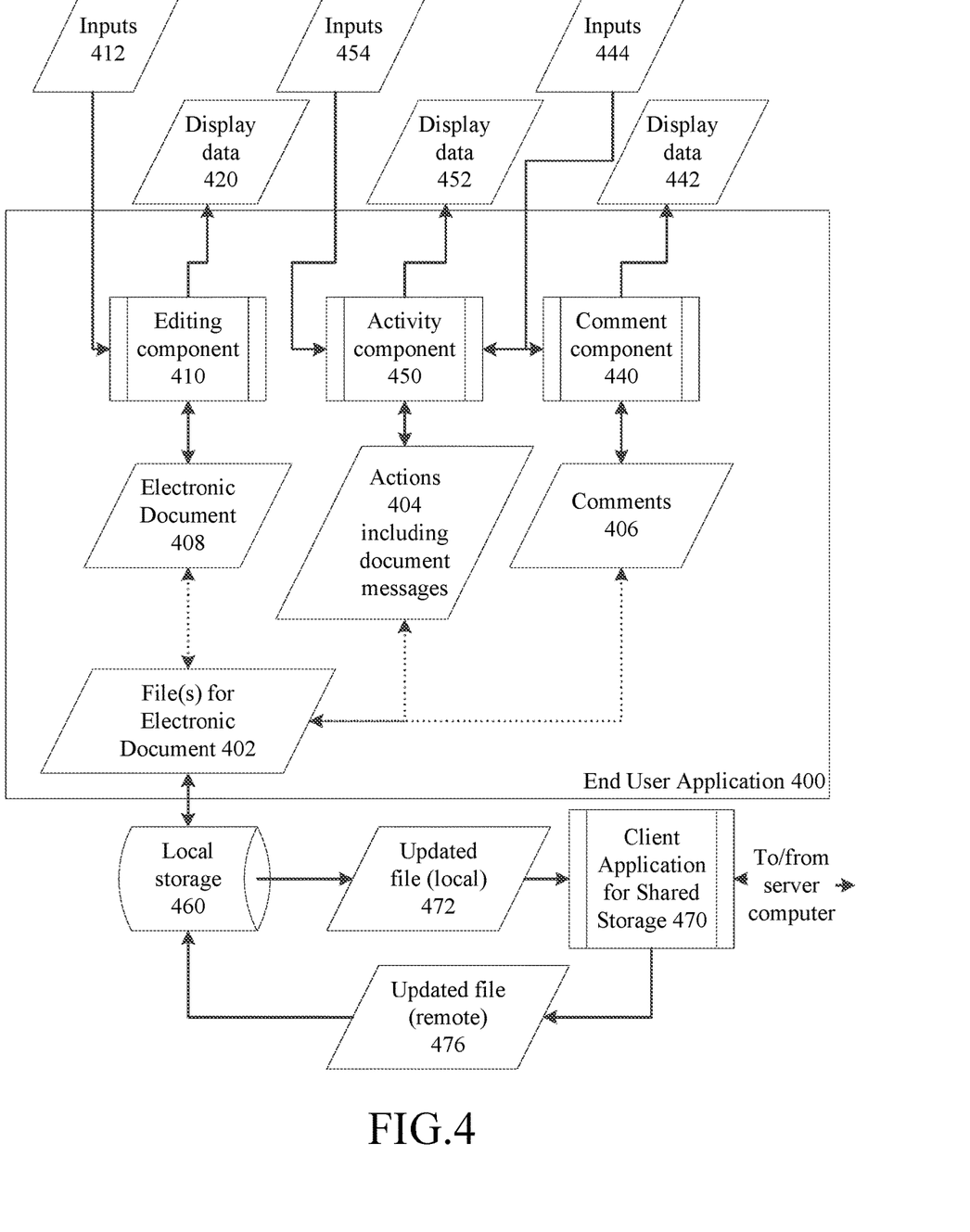
FIG. 4 is a data flow diagram of an example client computer configured to edit documents with document messages.

FIG. 4 is a data flow diagram of an example implementation of an end user application 400, running on a client computer, which includes a comment pane and an activity pane such as shown in FIG. 3. The end user application 400 has an input to receive one or more files 402 and/or other data defining the electronic document. The end user application generates, in memory, representations of a collection of actions 404 and a collection of comments 406 based on the received one or more files.

The files 402 may be received from local storage 460 and/or from a shared storage system (such as 100 in FIG. 1). In many shared storage systems, the files in local storage 460 are synchronized with copies of the files on a server computer in the shared storage system. For example, the end user computer can include a client application 470 for shared storage that periodically transmits an updated file 472 of the electronic document from the local storage 460 to the server computer. The server computer then transmits a copy of the electronic document received from one client computer to the other client computers that are using that electronic document. The client application 470 for the shared storage receives an updated file 476 of the electronic document from the server computer, and then updates the copy in local storage 460.

The end user application also processes the structure and content of the electronic document into memory to generate a representation of the electronic document 408, which is edited through an editing component 410. The editing component has inputs to receive user and system inputs 412 involved in the editing and storing of the electronic document, and outputs to provide display data 420 representing the electronic document being edited, and outputs to provide a modified electronic document back to storage as a file 402 upon saving. The end user application displays the display data 420 through a graphical user interface, which can include one or more displays and/or other output devices.

A comment component 440 manages interaction with the collection of comments 406. For example, the comment component generates display data 442 for a comment pane to be displayed in the graphical user interface 416 using the collection of comments 406. Also, the comment component can be responsive to user actions 444, such as adding a comment, deleting a comment, editing a comment, replying to a comment and resolving a comment, to update the data in the collection of comments 406. The comment component also can interactively update the display of the comments in response to updates to the data in the collection of comments.

An activity component 450 manages interaction with the collection of actions 404. For example, the activity component generates display data 452 for an activity pane to be displayed in the graphical user interface using the collection of actions 404, as described in more detail in connection with FIG. 5 below. Also, the activity component is responsive to user actions 454 with respect to the electronic document, such as opening, saving or closing the electronic document, and other actions related to comments, and other actions related to document messages, such as creating or replying to document messages, to update data for actions in the activity data.

Figure 5:
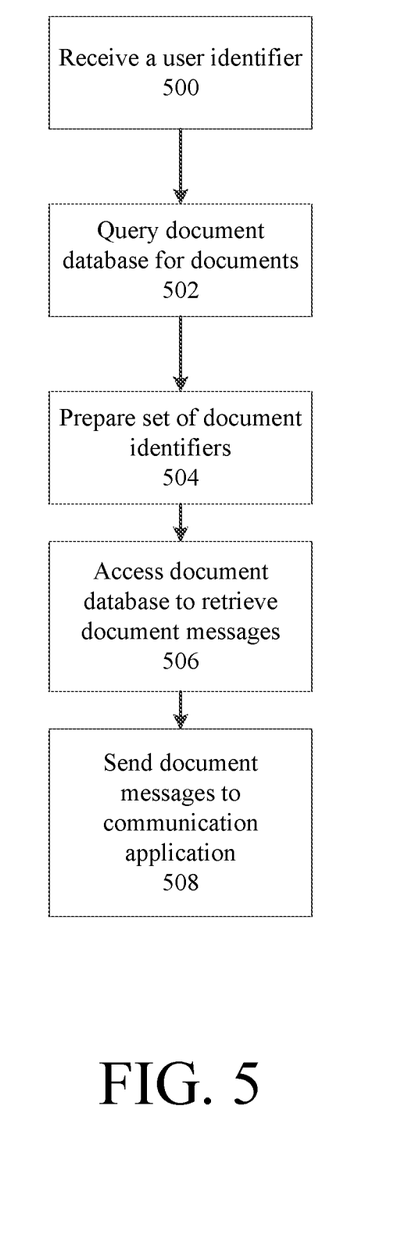
FIG. 5 is a flow chart describing an example implementation of an operation for a service accessing document messages.

Turning now to FIG. 5, a flowchart describing an example implementation of an operation for a service application (e.g., 150 in FIG. 1) on a server computer that interacts with a communication application to access document messages.

The service application receives 500 an identifier of a user from the communication application. The service application queries 502 a document database maintained by the file system of the shared storage system for documents for which this user has access to document messages, and prepares 504 a set of document identifiers. The service application accesses 506 the storage to retrieve, for each document identifier, a set of document messages stored in associated with the electronic document corresponding to that document identifier. For example, if the document messages are stored in a database in a JSON format, this database can be accessed to retrieve document messages. The service application then sends 508 the document messages to the communication application.

Figure 6:
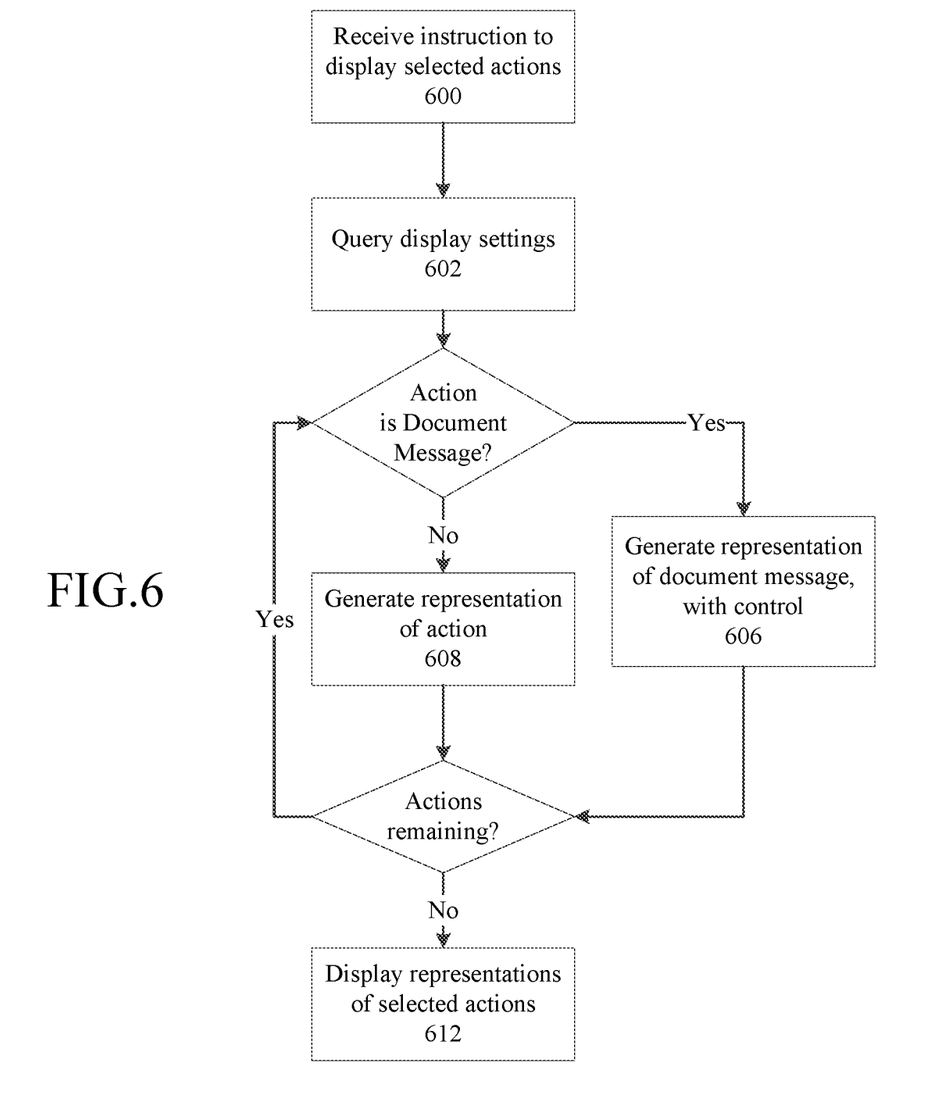
FIG. 6 is a flow chart describing an example implementation of an operation for generating and displaying an activity pane with document messages.

FIG. 6 is a flowchart describing an example implementation of an operation for an end user application for generating and displaying an activity pane. This operation is described in the context of a collection of actions associated with an electronic document and displayed in an activity pane such as in FIG. 3. This implementation is merely an example; there are other ways in which a collection of actions can be displayed in association with an electronic document.

The end user application receives 600 an instruction to display the actions from the activity data in the activity pane. The end user application queries 602 display settings for the activity pane. Such display settings can include any of a variety of settings, such as which actions to display, and how to sort the selected actions for display, and formatting information for displaying the actions, such as font type and size, color, backgrounds, and the like. As shown in FIG. 6, the end user application can select, for example, viewing actions that are document messages.

If an action to be displayed is a document message, as determined at 604, the displayed representation of the document message is generated 606, which can include one or more controls, such as a control for replying to the document message. Otherwise, a graphical representation of the action is generated 608, which depends on the type of action being displayed. If more actions remain from the selected set, as determined at 610, the process of steps 604-608 repeats. Otherwise, the generated representations of the selected actions are then displayed 612. The actions to be displayed can be displayed in any selected order, such as chronological, or by order with respect to any associated location in the document, or by order with respect to the end user that performed the action, and so on. For document messages, an example ordering is chronological and/or by thread.

By allowing users to create document messages, which are stored in a manner so as to be associated with an electronic document and use the same access controls as that electronic document, messages can be accessed by and delivered to communication applications for users that are not currently accessing the electronic document. At the same time, such document messages can still be associated with and viewed within the electronic document.

Figure 7:
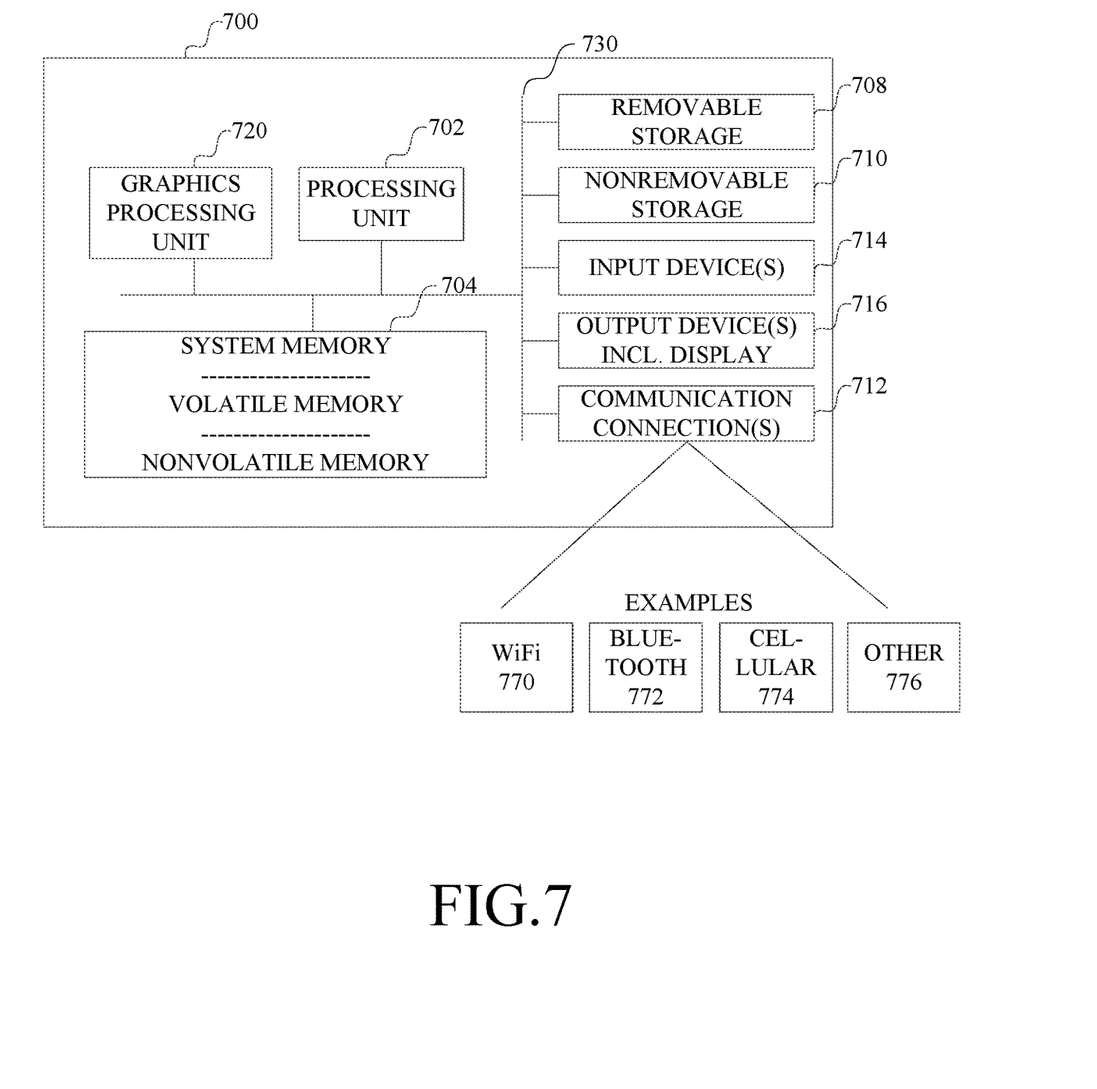
FIG. 7 is a block diagram of an example computer.

Having now described an example implementation, FIG. 7 illustrates an example of a computer with which such techniques can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 7, a computer 700 includes at least one processing unit 702 and memory 704. The computer can have multiple processing units 702 and multiple devices implementing the memory 704. A processing unit 702 can include one or more processing cores (not shown) that operate independently of each other. Additional co-processing units also can be present in the computer. The memory 704 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 700 can include additional storage, such as storage devices (whether removable or non-removable) including, but not limited to, magnetically-recorded or optically-recorded disks or tape. Such additional storage is illustrated in FIG. 7 by removable storage device 708 and non-removable storage device 710. The various components in FIG. 7 are generally interconnected by an interconnection mechanism, such as one or more buses 730.

A computer storage medium is any medium in which data can be stored in and retrieved from addressable physical storage locations by the computer. A computer storage medium thus can be a volatile or nonvolatile memory, or a removable or non-removable storage device. Memory 704, removable storage 708 and non-removable storage 710 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 700 may also include communications connection(s) 712 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 712 are devices, such as a wired network interface, wireless network interface, radio frequency transceiver, e.g., WiFi 770, cellular 774, long term evolution (LTE) or Bluetooth 772, etc., transceivers, navigation transceivers, e.g., global positioning system (GPS) or Global Navigation Satellite System (GLONASS), etc., or other devices 776 that interface with communication media to transmit data over and receive data from the communication media.

The computer 700 may have various input device(s) 714 such as a pointer device, keyboard, touch-based input device, pen, camera, microphone, sensors, such as accelerometers, thermometers, light sensors and the like, and so on. The computer 700 may have various output device(s) 716 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 710, communication connections 712, output devices 716 and input devices 714 can be integrated within a housing with the rest of the computer, or can be connected through various input/output interface devices on the computer, in which case the reference numbers 710, 712, 714 and 716 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 7.

The various modules and data structures of FIGS. 1-4, the flowcharts of FIGS. 5-6, as well as any operating system, file system and applications on a computer in FIG. 7, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer, configured as a local client computer, includes a computer comprises a network interface configured to connect the computer to a computer network. The computer network is connected to a shared storage system. The shared storage system comprises a file system configured to store a plurality of electronic documents and to make the plurality of electronic documents available to a plurality of users. The computer comprises a processing system that includes one or more processing units and storage, the storage comprising computer program code that, when executed by the processing system, configures the processing system. The processing system, as configured by the computer program code, comprises an application configured to process user input to modify an electronic document. The application includes a graphical user interface including a document pane configured to display the electronic document and a display of actions from activity data associated with the electronic document. Actions include at least document messages, wherein a document message comprises content, an identifier of a sender, and an identifier of a recipient. The application is further configured to process user input to at least create document messages associated with a currently open electronic document.

In another aspect, a computer-implemented process comprises processing user input to modify an electronic document, including presenting a graphical user interface of an application including a document pane configured to display the electronic document, and a display of actions from activity data associated with the electronic document. The actions include at least document messages, wherein a document message comprises content, an identifier of a sender, and an identifier of a recipient. The application processes user input to at least create document messages associated with a currently open electronic document.

In another aspect, a computer system comprises a shared storage system and a client computer. The client computer includes an application with a graphical user interface including a document pane configured to display the electronic document. The graphical user interface also displays actions in association with the electronic document. The actions are from activity data associated with the electronic document. The application includes means, operative in response to an input associated with displayed actions, for generating one or more documents messages associated with a currently open electronic document.

In any of the foregoing aspects, the application can display comments associated with locations in the electronic document.

In any of the foregoing aspects, the application can process user input to at least create replies to document messages as further document messages associated with the currently open electronic document.

In any of the foregoing aspects, data defining document messages associated with the currently open electronic document can be stored separately from the data defining the structure and content of the electronic document.

In any of the foregoing aspects, a communication application can be configured to access the data defining the document messages associated with an electronic document according to access controls associated with the electronic document. The communication application can be associated with a user and can be configured to access document messages associated only with electronic documents to which the user has access. The communication application can be associated with a first user and can be configured to receive a document message from a second user in response to the second user posting the document message in an electronic document authorized to be accessed by the first user.

In another aspect, an application on a computer includes means, operative in response to an input associated with displayed actions, for generating a document message.

In any of the foregoing aspects, an electronic document can include data defining structure and content of the electronic document, data defining comments associated with the electronic document, and actions associated with the electronic document.

In any of the foregoing aspects, the actions can include data describing actions performed by users and associated with the electronic document.

In any of the foregoing aspects, the actions can include document messages.

In any of the foregoing aspects, the actions can include actions with respect to the electronic document. Such actions can include, but are not limited to, opening, saving or closing a document, sharing the document, and changing permissions of the document.

In any of the foregoing aspects, the actions can include actions with respect to comments in the electronic document. Such actions can include, but are not limited to, adding, editing or deleting a comment, replying to a comment, marking a comment as resolved, and marking a comment as unresolved.

In any of the foregoing aspects, the actions can be displayed in an activity pane associated with the document pane in the graphical user interface.

In any of the foregoing aspects, the comments can be displayed in a comment pane associated with the document pane in the graphical user interface.

In any of the foregoing aspects, the activity pane, comment pane and document pane can be nonoverlapping panes in the graphical user interface.

In any of the foregoing aspects, the application is configured to provide a plurality of controls associated with displayed actions to allow filtering and sorting of actions.

In any of the foregoing aspects, the application is configured to filter actions by action type.

In any of the foregoing aspects, the application is configured to filter actions by user associated with the action.

In any of the foregoing aspects, the shared storage system is configured to update actions associated with the electronic document.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system of one or more computers, the computer system comprising:
a processing system comprising one or more processing units and storage, the storage comprising computer program code that, when executed by the processing system, configures the processing system to:
store an electronic document;
serve the electronic document to a first application over a network, the first application being configured to:
process user input to modify the electronic document, and
process user input to store, in a document database separate from the electronic document, a document message associated with the electronic document,
wherein the first application comprises a graphical user interface including a display of content of the electronic document and a display of one or more actions from activity data associated with the electronic document, and
wherein the one or more actions include the document message associated with the electronic document;
receive a user identifier originating from a device on the network;
query the document database for one or more document identifiers associated with the user identifier, wherein at least one of the one or more document identifiers corresponds to the electronic document;

access the document database to retrieve one or more document messages associated with the one or more document identifiers, wherein the one or more document messages includes the document message associated with the electronic document;

send the one or more document messages, via the network, to a second application configured differently relative to the first application and associated with the user identifier.

2. The computer system of claim 1, wherein the first application is further configured to display comments associated with locations in the electronic document.

3. The computer system of claim 1, wherein the first application is further configured to process user input to create replies to document messages as further document messages associated with the electronic document.

4. The computer system of claim 1, wherein data defining document messages associated with the electronic document are stored separately from data defining structure and content of the electronic document.

5. The computer system of claim 1, wherein the second application is a communication application configured to access data defining the document messages associated with the electronic document according to access controls associated with the electronic document.

6. The computer system of claim 5, wherein the second application is associated with a second user and is configured to access document messages associated only with electronic documents to which the second user has access and to receive the document message from a first user in response to the first user posting the document message in an electronic document authorized to be accessed by the second user.

7. The computer of claim 1, wherein the document message includes message content and further includes identification of a first user as a sender of the document message and identification of a second user as a recipient of the document message.

8. A computer system of one or more computers, the computer system comprising:
a processing system comprising one or more processing units and storage, the storage comprising computer program code that, when executed by the processing system, configures the processing system to:
store an electronic document;
serve the electronic document to a first application over a network, the first application being configured to:
process user input to modify the electronic document, and
process user input to store, in a document database separate from the electronic document, a document message associated with the electronic document,
wherein the first application comprises a graphical user interface including a document pane configured to display content of the electronic document, a comment pane configured to display a plurality of comments associated with particular regions of the electronic document, and, distinct from the comment pane, an activities pane configured to display one or more actions from activity data associated with the electronic document, and
wherein the one or more actions include the document message associated with the electronic document;
receive a user identifier originating from a device on the network;
query the document database for one or more document identifiers associated with the user identifier, wherein at least one of the one or more document identifiers corresponds to the electronic document;
access the document database to retrieve one or more document messages associated with the one or more document identifiers, wherein the one or more document messages includes the document message associated with the electronic document;
send the one or more document messages, via the network, to a second application configured differently relative to the first application and associated with the user identifier.

9. The computer system of claim 8, wherein the first application is further configured to display comments associated with locations in the electronic document in the electronic document.

10. The computer system of claim 8, wherein the first application is further configured to process user input to create replies to document messages as further document messages associated with the electronic document.

11. The computer system of claim 8, wherein data defining document messages associated with the electronic document are stored separately from data defining structure and content of the electronic document.

12. The computer system of claim 8, wherein the second application is a communication application configured to access the data defining the document messages associated with the electronic document according to access controls associated with the electronic document.

13. The computer system of claim 12, wherein the second application is associated with a second user and is configured to access document messages associated only with electronic documents to which the second user has access.

14. The computer system of claim 12, wherein the second application is associated with a second user and is configured to receive the document message from a first user in response to the first user posting the document message in an electronic document authorized to be accessed by the second user.

15. A computer-implemented process comprising:
storing an electronic document;
serving the electronic document to a first application over a network, the first application being configured to:
receive user input on a graphical user interface including a display of content of the electronic document and a display of one or more actions from activity data associated with the electronic document;
process user input to modify the electronic document, and
process user input to store, in a document database separate from the electronic document, a document message associated with the electronic document, wherein the one or more actions include the document message associated with the electronic document;
receiving a user identifier originating from a device on the network;
accessing the document database to retrieve one or more document messages associated with one or more document identifiers, wherein the one or more document messages includes the document message associated with the electronic document; and
sending the one or more document messages, via the network, to a second application configured differently relative to the first application and associated with the user identifier.

16. The computer-implemented process of claim 15, wherein the first application is further configured to display comments associated with locations in the electronic document.

17. The computer-implemented process of claim 15, wherein the first application is further configured to process user input to create replies to document messages as further document messages associated with the electronic document.

18. The computer-implemented process of claim 15, wherein data defining document messages associated with the electronic document are stored separately from data defining structure and content of the electronic document.

19. The computer-implemented process of claim 15, wherein the second application is a communication application configured to access the data defining the document messages associated with the electronic document according to access controls associated with the electronic document.

20. The computer-implemented process of claim 19, wherein the communication application is associated with a second user and is configured to receive the document message from a first user in response to the first user posting the document message in an electronic document authorized to be accessed by the second user.

* * * * *